US007103826B2

(12) United States Patent  
Thayer et al.

(10) Patent No.: US 7,103,826 B2
(45) Date of Patent: Sep. 5, 2006

(54) MEMORY SYSTEM AND CONTROLLER FOR SAME

(75) Inventors: Larry Thayer, Fort Collins, CO (US); Eric McCutcheon Rentschler, Fort Collins, CO (US); Michael Kennard Tayler, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/632,199

(22) Filed: Jul. 31, 2003

(65) Prior Publication Data

US 2005/0028069 A1    Feb. 3, 2005

(51) Int. Cl.
*G06F 11/10* (2006.01)

(52) U.S. Cl. .................. 714/763; 711/114; 714/770; 714/805

(58) Field of Classification Search ............... 714/763, 714/770, 805; 711/114
See application file for complete search history.

(56) References Cited

U.S. PATENT DOCUMENTS

| | | | |
|---|---|---|---|
| 5,617,425 A * | 4/1997 | Anderson ............... 714/710 |
| 5,859,965 A | 1/1999 | Gittins et al. |
| 5,860,003 A * | 1/1999 | Eidler et al. ............. 718/106 |
| 5,896,492 A * | 4/1999 | Chong, Jr. ............... 714/3 |
| 5,901,327 A * | 5/1999 | Ofek ....................... 710/5 |
| 5,922,077 A * | 7/1999 | Espy et al. ............... 714/7 |
| 5,933,592 A * | 8/1999 | Lubbers et al. .......... 714/6 |
| 5,937,174 A | 8/1999 | Weber |
| 5,953,352 A | 9/1999 | Meyer |
| 5,991,891 A * | 11/1999 | Hahn et al. .............. 714/4 |
| 6,058,054 A | 5/2000 | Islam et al. |
| 6,067,635 A | 5/2000 | DeKoning et al. |
| 6,098,119 A | 8/2000 | Surugucchi et al. |
| 6,151,659 A | 11/2000 | Solomon et al. |
| 6,311,251 B1 | 10/2001 | Merritt et al. |
| 6,327,672 B1 | 12/2001 | Wilner |
| 6,347,359 B1 | 2/2002 | Smith et al. |
| 6,349,359 B1 | 2/2002 | Gittins et al. |
| 6,658,590 B1 * | 12/2003 | Sicola et al. ............. 714/6 |
| 2004/0250029 A1 * | 12/2004 | Ji et al. ................... 711/162 |
| 2005/0210317 A1 * | 9/2005 | Thorpe et al. ........... 714/6 |

OTHER PUBLICATIONS

Patterson et al.; "A Case for Redundant Arrays of Inexpensive Disks (RAID)"; 1988.
Advanced Computer and Network Corporation; "www.acnc.com"; printed Dec. 11, 2002.
USByte.com; "www.usbyte.com/comon/raid_systems.htm"; printed Dec. 11, 2002.

* cited by examiner

*Primary Examiner*—Stephen M. Baker (57) ABSTRACT

The present invention is broadly directed to a memory system comprising a a host integrated circuit component, at least two data memories, at least one parity memory for storing parity information corresponding to data stored in a corresponding address space of the data memories, and at least two controller integrated circuits. Each controller integrated circuit (IC) comprises memory control logic configurable to control communications between the controller IC and data memories directly connected to the controller IC, parity logic configurable to compute parity information for data communicated to or from the data memories, logic configurable to communicate the parity information to or from a companion IC, and logic configurable to communicated data to or from a companion IC.

16 Claims, 8 Drawing Sheets

MEMORY SYSTEM AND CONTROLLER FOR SAME

BACKGROUND

As is known, redundant array of inexpensive disks (RAID) is a technology used to improve the input/output performance and reliability of mass storage devices. A RAID array incorporates fault tolerance by using a redundant architecture, and the disk controller which controls a RAID array is called a RAID controller. In RAID systems, data is stored across multiple storage units (e.g., disks) in order to provide immediate access to the data despite the failure of one or more storage unit.

Fundamental to RAID technology is "striping," which refers to a particular method of combining multiple storage units into one logical storage unit. Striping partitions the storage space of each drive into "stripes" that can be as small as one sector (512 bytes) or as large as megabytes. These stripes are then interleaved in a rotating sequence, so that the combined space is composed alternatively of stripes from each drive.

One major task of a RAID controller is to protect against data loss created by hardware failure. RAID controllers have been defined at different "levels" to provide different sets of features.

RAID Level 0, also referred to as RAID 0, consists of a stripe set that presents multiple disks as a single virtual disk whose capacity is equal to the sum of the capacities of the individual disks. The reliability of the stripe is less than the reliability of its least reliable member. RAID 0 is not a true redundant controller because it provides no redundancy. However, its use of parallel transfer technology is a performance-oriented architecture that is inexpensive and therefore attractive to many low cost users.

RAID Level 1, also referred to as RAID 1, creates a virtual storage unit from a mirrored set of storage units. Mirroring is implemented on a pair of storage units that store duplicate data but appear to the computer as a single storage unit. Although striping is not used within a single mirrored storage-unit pair, multiple RAID 1 arrays can be striped together to create a single large array. RAID 1 provides high reliability.

RAID Level 2, also referred to as RAID 2, is a parallel access array that uses Hamming coding to provide error detection and correction capability to the array. This is an expensive approach and is not popularly used.

RAID Level 3, also referred to as RAID 3, is optimized for high data rates and is a parallel transfer technique with parity. Each data sector is subdivided, and data is scattered across all data storage units with redundant data being stored on a dedicated parity storage unit. Reliability is much higher than a single storage unit and the data transfer capacity is quite high. A weakness of RAID 3 lies in its relatively slow I/O rates that make it unsuitable for several transaction processing applications unless assisted by some other technology such as cache.

RAID Level 4, also referred to as RAID 4, is similar to RAID 3 in certain respects. Redundant data is stored on an independent parity storage unit, similar to RAID 3. RAID 4 improves on the performance of a RAID 3 system with respect to random reading of small files by "uncoupling" the operation of the individual storage unit drive actuators, and reading and writing a larger minimum amount of data to each disk. This capability allows high I/O read rates but has moderate write rates. RAID 4 is suitable mainly for systems that are read intensive and do not require high data transfer rates.

RAID Level 5, also referred to as RAID 5, is an independent access array with rotating parity. Data sectors are distributed in the same manner as disk striping systems but redundant information is interspersed with user data across multiple array members rather than stored on a single parity storage unit as in RAID 3 or RAID 4 systems. This relieves the write bottleneck associated with RAID 4 controllers that use a single dedicated parity storage unit. RAID 5 arrays have high data reliability, good data transfer rates and high I/O rate capability.

Figure 1:
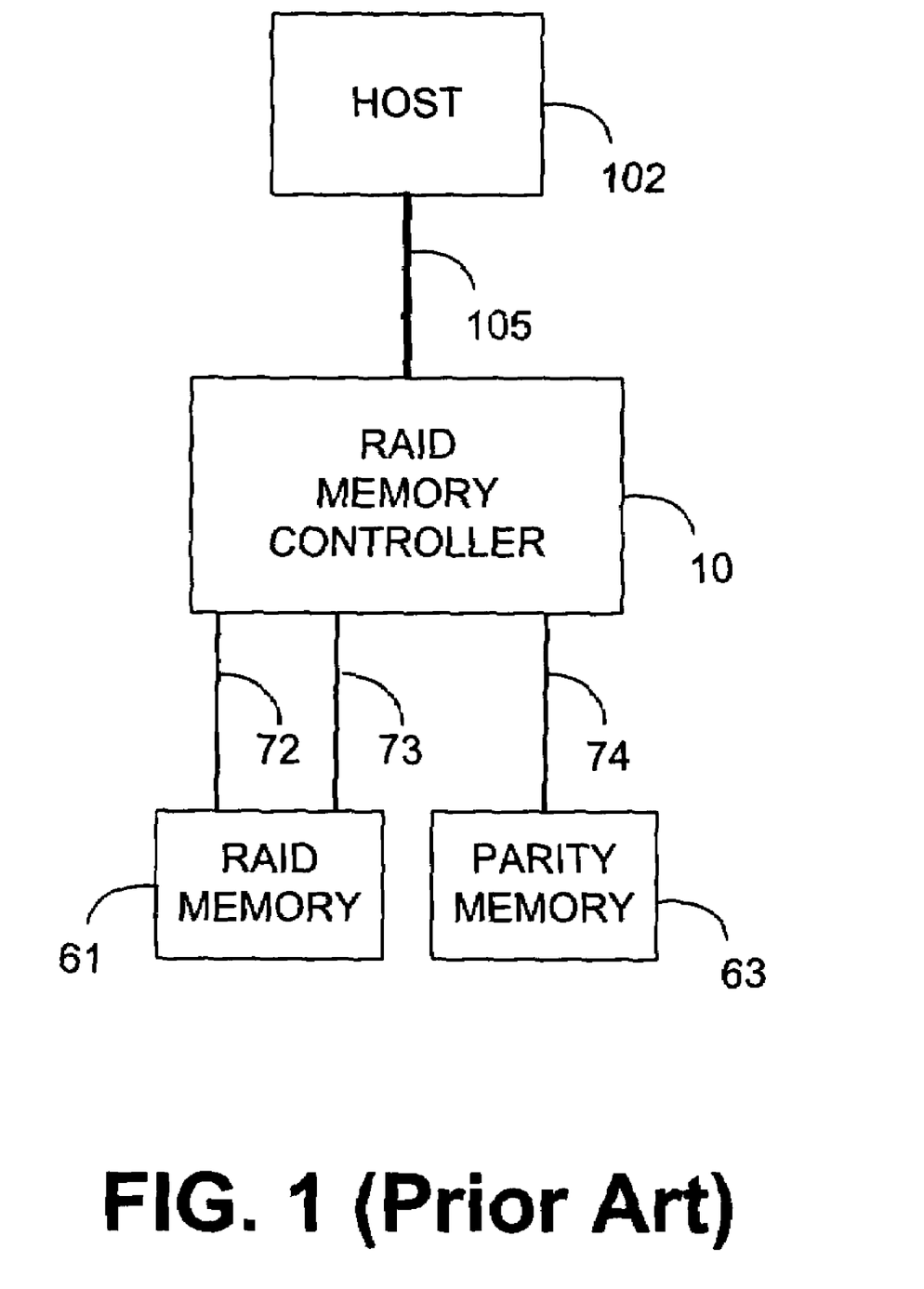
FIG. 1 is a block diagram illustrating a conventional RAID memory system, as is known in the art.

The foregoing has generally described RAID systems in the disk drive market. However, as is known, RAID systems have expanded from the disk drive market into the semiconductor memory market. Thus, RAID systems are known to be implemented in silicon memory, as well as magnetic and optical drives. Reference is made to FIG. 1, which is a block diagram illustrating such a conventional RAID memory system.

As illustrated in FIG. 1, RAID memory systems that are known include a RAID memory controller 10 coupled to RAID memory 61 and parity memory 63, the RAID memory 61 may be any of a variety of types of memories, such as DRAM. Also, a commonly-referred to type of RAID memory is DIMM (dual inline memory module) memory. A host 102 and system bus 105 are also illustrated in FIG. 1. Information or data communicated between the host 102 and RAID memory 61 are communicated through the RAID memory controller 10. Internal to the RAID memory controller is logic for generating parity information for the data stored within the RAID memory 61. Details regarding the structure and operation of the system illustrated in FIG. 1 are well known, and need not be described herein. What is relevant for the purposes described herein is the vertical relationship between the host 102, the RAID memory controller 10, and the RAID memory 61. As the channel widths of the communication channels 72, 73, and 74 increase, the pin count on the RAID memory controller 10 increases as well. Due to fabrication costs, and as is known, this increased pin count can significantly drive up the component cost of the RAID memory controller 10.

Further, known memory RAID systems and solutions provide RAID at a memory controller level rather than a DIMM bus level. This, unfortunately, requires an additional level of hierarchy and additional chips and system complexity.

SUMMARY OF THE INVENTION

Accordingly, it is desired to provide a system that effectively addresses the foregoing and other shortcomings of prior art systems. In this regard, the present invention is broadly directed to a memory system comprising a a host integrated circuit component, at least two data memories, at least one parity memory for storing parity information corresponding to data stored in a corresponding address space of the data memories, and at least two controller integrated circuits. Each controller integrated circuit (IC) comprises memory control logic configurable to control communications between the controller IC and data memories directly connected to the controller IC, parity logic configurable to compute parity information for data communicated to or from the data memories, logic configurable to communicate the parity information to or from a companion IC, and logic configurable to communicated data to or from a companion IC.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENTS

As described herein, there are various aspects and embodiments of the present invention. In accordance with one embodiment, the present invention is directed to a unique integrated circuit structure for implementing a memory controller in a RAID memory system. Before describing the structure of the integrated circuit that is uniquely directed to a RAID memory controller, reference will first be made to a generic, internal structure of the integrated circuit, in accordance with certain aspects and embodiments of the invention.

Figure 2:
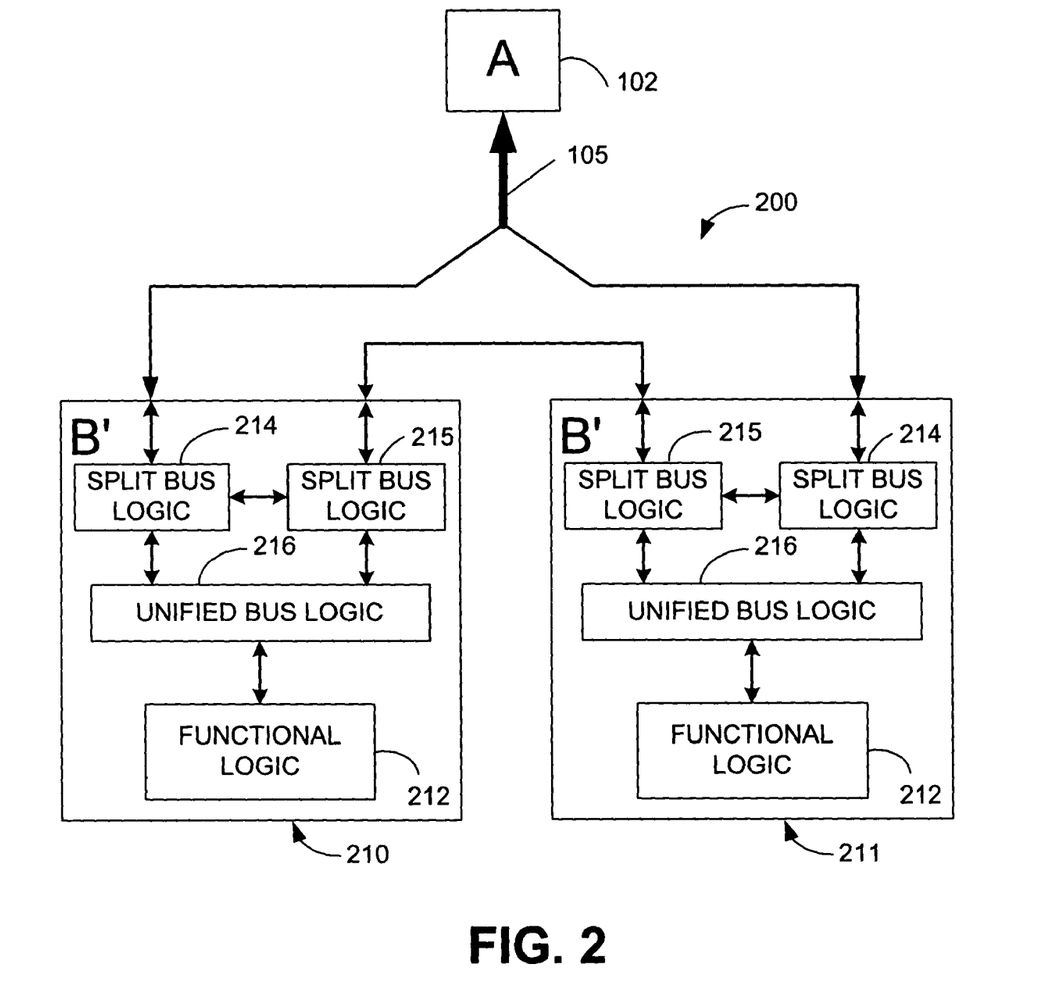
FIG. 2 is a block diagram illustrating a system constructed in accordance with one embodiment of the present invention, in which functional logic of a single, conventional integrated circuit component is split across two integrated circuit components.

In this regard, reference is made to FIG. 2, which is a block diagram illustrating an embodiment of the present invention. In this regard, an embodiment is directed to a system having two, companion integrated circuit components that collectively operate to emulate an integrated circuit component that is conventionally provided on a single chip. When emulating integrated circuit components, such as a memory controller (e.g., RAID controller), manufacturing costs generally increase with increasing pin count. While the embodiment illustrated in FIG. 2 results in additional on-chip circuitry (described below), the combination of companion components 210 and 211 that effectively emulate a single, conventional component provides other improvements over the conventional-component approach. One such benefit is the manufacturing cost reduction by virtue of a reduction in the number of conductive pins that are required for a single integrated circuit component 210. In fact, the manufacturing cost for a single component 210 may be more than cut in half, making the use of two such components (as in FIG. 2) to emulate a single device more cost effective than using a single, conventional device. Another such benefit may be realized through bandwidth enhancements or the accommodation of greater bandwidth through the combined functional circuitry of the components 210 and 211.

The integrated circuit component 210 includes functional logic 212 that performs the functional aspects of the conventional integrated circuit component that the components 210 and 211 combine to replace. Therefore, a discussion of the functional logic 212 need not be provided herein. With regard to certain unique features of the system 200, the integrated circuit components 210 and 211 include logic blocks denoted as "split bus logic" 214 and 215 and "unified bus logic" 216.

As illustrated in FIG. 1, a conventional configuration includes integrated circuit components 102 and 10 that intercommunicate across a system bus 105. In the system 200 of FIG. 2, the system bus 105 is split, so that approximately one half of the bus is directed to integrated circuit component 210, while the remaining portion of the bus 105 is directed to integrated circuit component 211. A split bus logic component 214 is provided to interface with the portion of the system bus 105 directed to that particular integrated circuit component. Both integrated circuit components 210 and 211 have blocks denoted by reference numerals 214 and 215. In one embodiment, the circuitry and logic within the split bus logic components 214 and 215 are identical. However, the logic blocks have been denoted with differing reference numerals to indicate a differing functionality, based upon the configuration of those logic blocks. For example, in the configuration illustrated in FIG. 2, the split bus logic blocks 214 are configured to interface with a portion of the system bus 105. Split bus logic blocks 215 are configured to interface with the companion logic block of the companion integrated circuit component. Thus, the split bus logic block 215 of component 210 interfaces directly with the split bus logic block 215 of component 211.

In operation, data that is received by split bus logic block 214 of component 210 is passed through split bus logic 215 of component 210, and split bus logic 215 of component 211. Likewise, data received from the system bus 105 through split bus logic 214 of component 211 is passed through split bus logic 215 of component 211 and through split bus logic 215 of component 210. Through this sharing and passage of data, the entirety of the data communicated over the system bus 105 may be provided to each of the components 210 and 211. This data is consolidated by the unified bus logic component 216 of each of these two devices. Thereafter, the functional logic 212 in each of the components 210 and 211 may operate on the data as appropriate. It should be appreciated that the manner in which the functional logic 212 operates on the data will depend upon the particular embodiment and environment of the functional logic that is being implemented. A specific illustration of one embodiment is presented in connection with FIG. 5, which will be described below.

One benefit of the embodiment is the cost reduction that is realized through reductions in manufacturing costs of the integrated circuit components 210 and 211 by virtue of pin count reduction. Although such a reduction is not necessarily evident from the illustration of FIG. 2, however, as the functional logic 212 interfaces with external integrated circuit components, the reduction in pin count can more readily be identified (see FIGS. 5–8).

In one embodiment, not specifically illustrated, the split bus logic 214 and/or 215 may be equipped with additional logic for determining, based upon the content of the information received from the system bus 105, whether that data needs to be communicated to the companion integrated circuit component. For example, if it is determined by the split bus logic 214 of component 210 that data received from the system bus 105 is uniquely directed to the functional logic 212 of component 210, and not the functional logic 212 of component 211, then this additional logic (not shown) may determine that the received data need not be communicated to the companion component 211. It will be appreciated by persons skilled in the art that there are a variety of embodiments in which just such a determination may be identifiable, and therefore desirably implemented.

It should be further appreciated that a benefit of the integrated circuit component 210 and/or 211 is that the system 200 may be implemented without the knowledge of component 102. That is, the two integrated circuit components 210 and 211 may be implemented in a system having the configuration illustrated in FIG. 2, in place of a conventional prior art component 10, without any configuration or other change with respect to device 102. In this regard, device 102 does not "know" whether it is dealing with a conventional component 10 or components 210 and 211.

Figure 3:
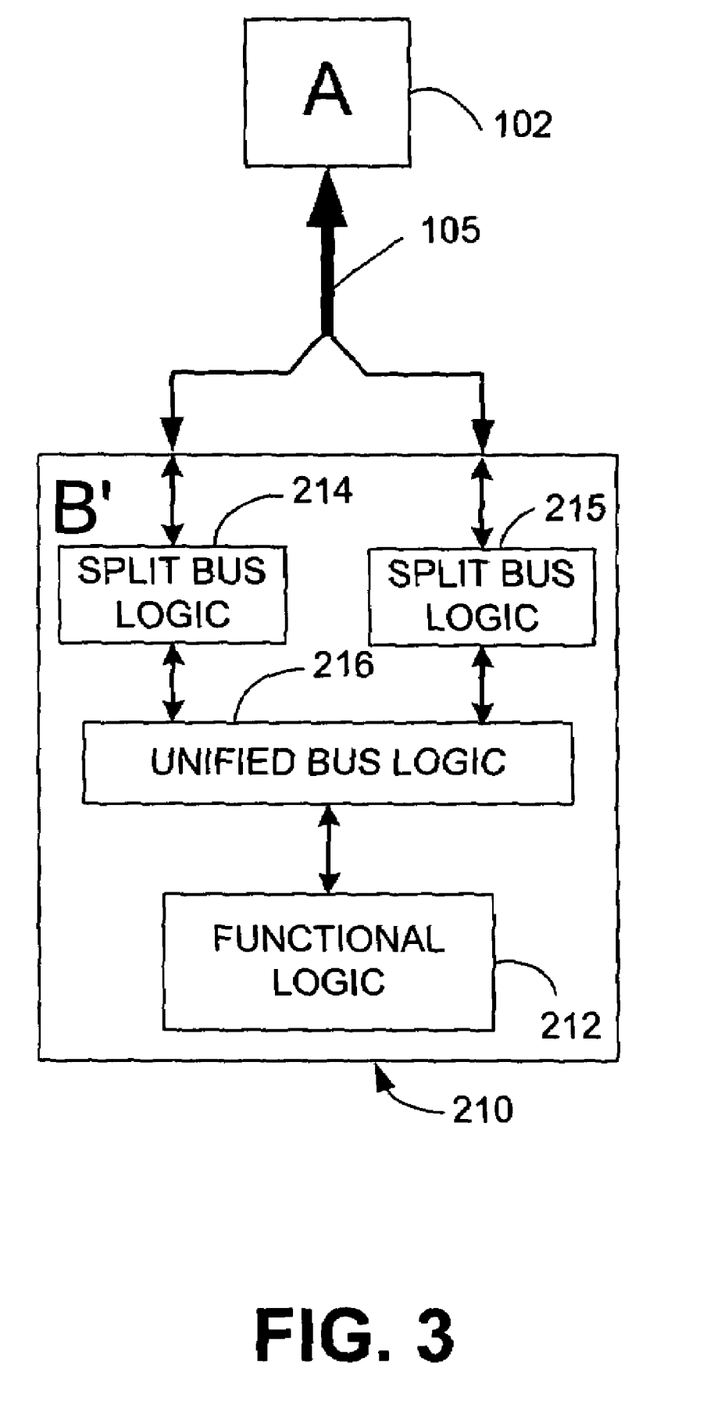
FIG. 3 is a block diagram illustrating an integrated circuit component of an embodiment of the present invention, in which a single integrated circuit component is configured to operate in a single-chip configuration to mimic an otherwise conventional integrated circuit component.

Reference is now made briefly to FIG. 3, which illustrates a component 210 constructed in accordance with an embodiment of the invention. In this embodiment, the component 210 contains the same internal logic elements, which include split bus logic 214 and unified bus logic 216. However, as opposed to the configuration of FIG. 2, wherein split bus logic components 215 were configured to intercommunicate data to a companion integrated circuit component, the split bus logic components 214 of the embodiment of FIG. 3 merely interface directly with the system bus 105 and communicate the data directly to the unified bus logic 216. Since only one integrated circuit component 210 is utilized in the embodiment of FIG. 3, no split bus logic component need be configured in the configuration of the split bus logic component 215 of FIG. 2.

Figure 4:
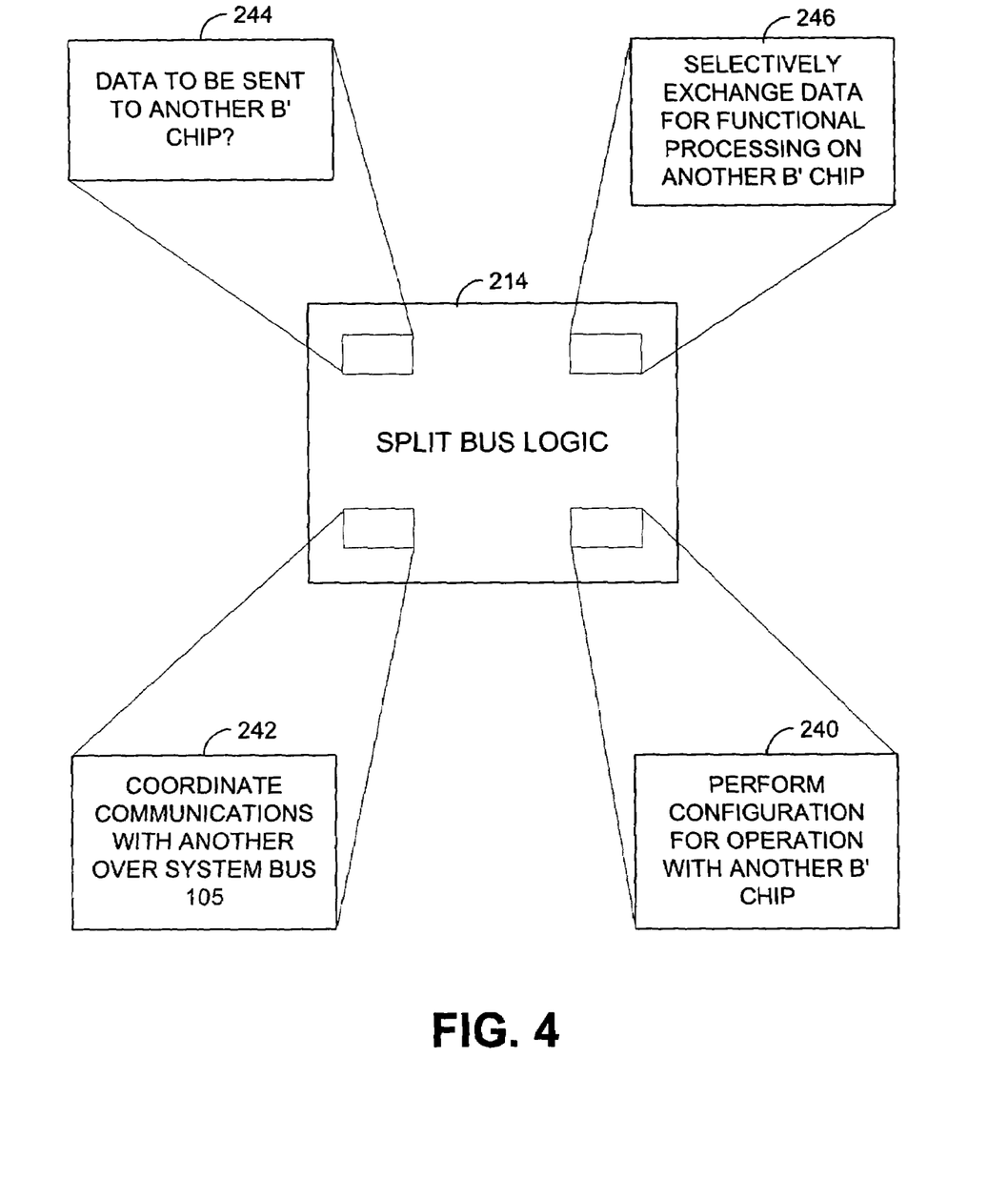
FIG. 4 is a block diagram illustrating portions of a logic interface that may be implemented in an embodiment of the present invention.

Reference is now made to FIG. 4, which illustrates certain internal logic components of a split bus logic component 214. In one embodiment, the component 214 includes internal logic 240 for performing or providing a configuration of the component 214 for operation with a companion component that is provided within a companion integrated circuit component. The logic 240 configures the split bus logic component 214 to operate in the configuration of split bus logic component 215 of FIG. 2. When in this configuration, data received from a companion split bus logic component 214 (in the same integrated circuit component) is communicated over an external bus or communication path to a companion split bus logic component in a different (companion) integrated circuit component.

Another component 242 within the split bus logic 214 coordinates and controls communications over the system bus 105. This component 242 may be implemented using known circuitry and logic for performing protocol conversions and other actions that are customary and appropriate for communicating with external devices over a specified communication bus.

Component 244 may be provided for determining whether data received from the system bus 105 is to be communicated to a companion integrated circuit component. As previously mentioned, the split bus logic may include sufficient intelligence to determine, based upon the content of the information received over the system bus 105, whether the data received over the system bus 105 is to be communicated to a companion integrated circuit component. Finally, a component 246 may be provided to selectively exchange data with a companion split bus logic component of a companion integrated circuit component for processing by the functional logic within that companion integrated circuit component. Of course, additional components may be provided within the split bus logic 214, as will be appreciated by persons skilled in the art, but need not be described herein for purposes of understanding the structure and operation of the illustrated embodiment.

Figure 5:
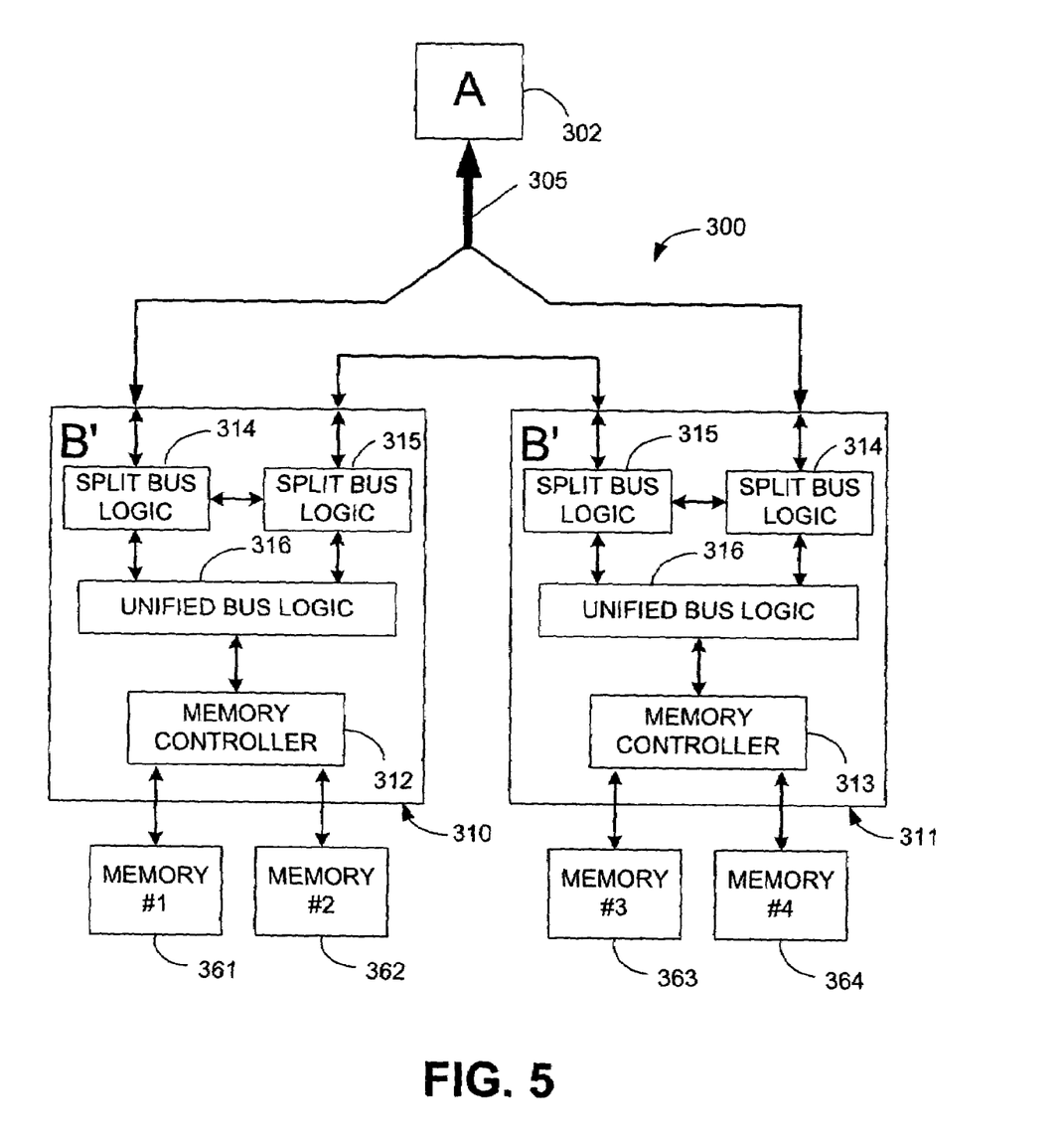
FIG. 5 is a block diagram similar to FIG. 2, illustrating an embodiment of the present invention, in which a plurality of integrated circuit components implement a memory controller component.

Finally, reference is made to FIG. 5, which is a diagram similar to FIG. 4, illustrating the implementation of components 310 and 311, constructed and configured in accordance with the present invention, to implement a memory controller device. In this regard, the system 300 includes a system bus 305 that communicates with a device, such as a host processor 302. The host processor 302 may issue commands to read and/or write to memory devices 361, 362, 363, and 364. The internal components, including the split bus logic components 314 and 315 and the unified bus logic component 316 are configured to operate in the manner described in connection with FIG. 2 herein. The functional logic 212 illustrated and described in connection with FIG. 2 is replaced by the memory controller logic 312 and 313 of FIG. 5.

By way of illustration, suppose the host 302 wishes to read data from memory 361. Appropriate address and control signals are asserted on the system bus 305 to implement such a memory read command. Approximately one half of this system bus is directed to component 310 while the remaining portion of the signals of the system bus 305 are directed to component 311. Since the memory 361 to be accessed is coupled with component 310, the split bus logic components within component 310 may determine that no information received from the split bus logic 314 of component 310 needs to be communicated to the split bus logic component 315 of component 311. However, depending upon the bus configuration of system bus 305, data or information communicated to the split bus logic 314 of component 311 may be required to be communicated through the split bus logic components 315 so that the information may be unified by logic 316 for communication to the memory controller 312.

Likewise, once data is read from the memory 361 and passed through the memory controller 312 and unified bus logic 316 of component 310, part or all of the information may be communicated through split bus logic 314 of component 310, the system bus 305, to the host processor 302. Similarly, all or part of the information may be passed through split bus logic components 315 of components 310 and 311, the split bus logic 314 of component 311, the system bus 305 and onto the host processor 302. The direction and routing of information through the various subcomponents of integrated circuit components 310 and 311 will depend largely upon the structure, design, and protocol of the system bus 305. In one embodiment, the present invention is designed for operation with a point-to-point serial bus, having multiple data and control lines for communicating data and control signals between integrated circuit components. However, consistent with the concepts and teachings of the present invention, other types of system bus configurations may be supported.

As mentioned above, one benefit of the illustrated embodiments is lower manufacturing costs resulting from a reduced number of pins (per chip) for carrying out the collective operation (e.g., configurations of FIGS. 2 and 5). In such embodiments, a first set of conductive pins is provided on the component for carrying communications between the split logic bus interface 214 and the portion of the system bus 105 (e.g., communications with a remote component 102). A second set of conductive pins is provided on the component for carrying communications between the companion split logic bus interfaces 215 of companion components. Additional conductive pins may be provided for carrying other control and communication signals. The total number of conductive pins for the integrated circuit component is fewer than a conventional integrated circuit component for performing the same functional operation.

The above paragraph illustrates how, in one embodiment, two chips may be connected on the system bus without increasing the number of system bus pins on each component, which is one advantage of this invention. With regard to FIG. 5, however, another significant reduction in pin count is realized. In this regard, a conventional memory controller component would require 4 sets of memory interconnect pins to interface the four memory busses of memories 361, 362, 363, and 364 to the system bus 305. The illustrated embodiment, as shown in FIG. 5, reduces the required memory interface pins per component by half (per chip), which will result in a significant reduction in the manufacturing cost of the component.

It should be appreciated that there are a variety of ways to implement the requisite circuitry and logic for carrying out the functionality and operations described above. One such particular implementation is described and illustrated in co-pending application Ser. No. 10/630,260, entitled "Integrated Circuit with a Scalable High-Bandwidth Architecture," and filed on Jul. 30, 2003 which co-pending application is incorporated herein by reference.

Having described certain embodiments that embody one aspect of the invention, reference will now be made to another aspect of the present invention. In this regard, reference is made to FIG. 6, which is a diagram similar to the diagram of FIG. 2. The diagram of FIG. 6, however, illustrates a system 400 having an additional chip 410 interposed between the chips 210 and 211. The chip 410 may be identical in design to the chips 210 and 211. In configuration, however, split bus logic interfaces 415a and 415b are configured in the same was as split bus logic 215 of chip 210 and 211.

Figure 6:
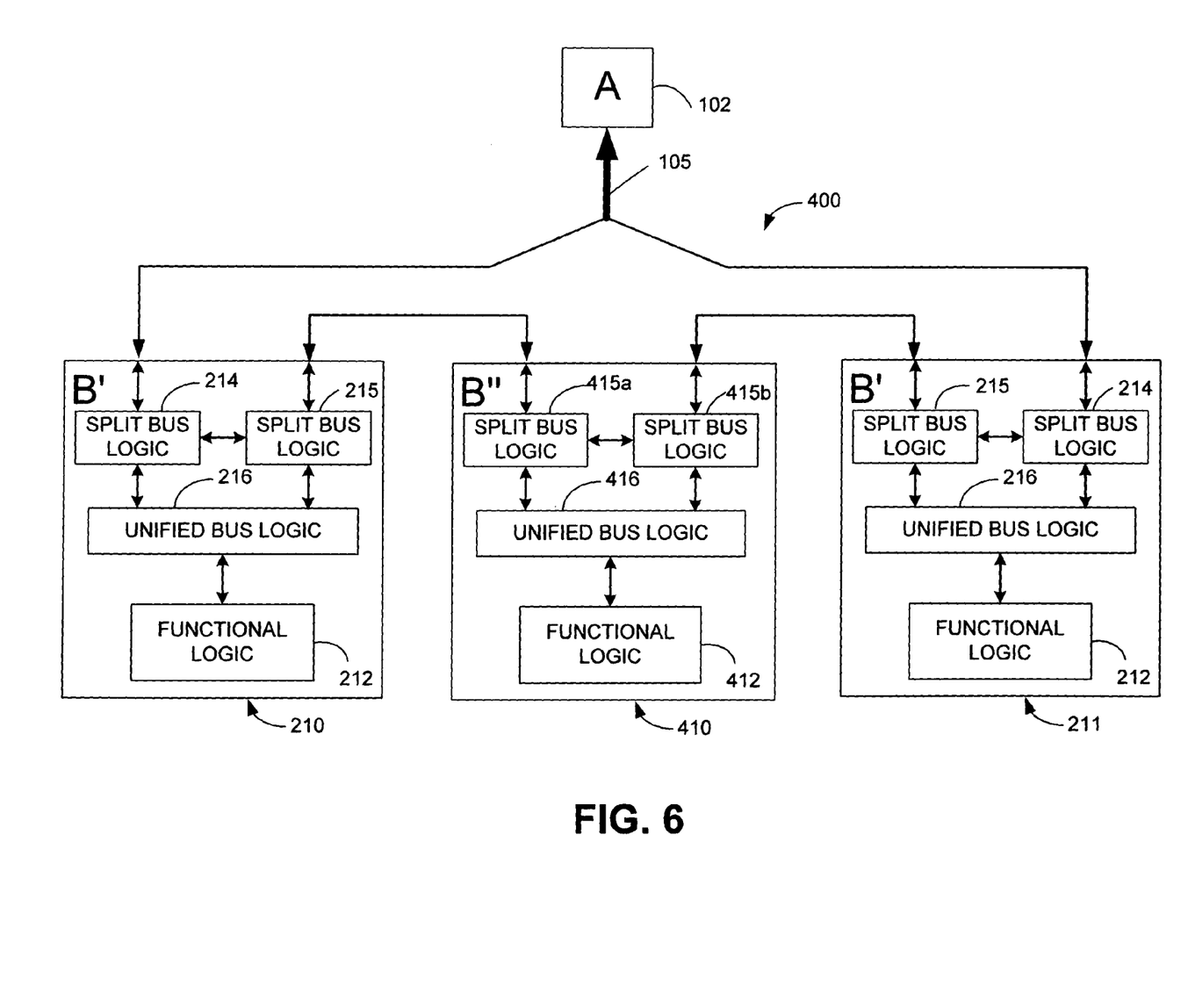
FIG. 6 is a block diagram similar to FIG. 2, illustrating an embodiment of the present invention, in which an additional inventive integrated circuit component is configured to be interposed between two inventive components that are coupled to a system bus.

Specifically, the split bus logic interfaces 415a and 415b are configured to merely pass all information received from a split bus logic interface from another chip to the companion split bus logic interface (e.g., split bus logic interface 415a passes all information from split bus logic 215 of chip 210 to split bus logic interface 415b, and split bus logic interface 415b passes all information from split bus logic 215 of chip 211 to split bus logic interface 415a).

In one embodiment, the unified bus logic 416 and functional logic 412 may be inactive, and no information communicated from chips 210 and 211 is passed through the unified bus logic 416 to the functional logic 412. In an alternative, but similar embodiment, however, the split bus logic interfaces 415a and 415b may be configured to pass information through the unified bus logic 416 to the functional logic 412. In such an embodiment, the functional logic 412 of the chip 410 may share in the processing workload, to assist the functional logic 212 of chips 210 and 211 with the desired functional processing.

For example, although not specifically illustrated, the embodiment of FIG. 6 may be used in an implementation such as that illustrated in FIG. 5 (e.g., as a memory controller) to further expand the number of memories that may be accessed by the collective memory controller of chips 210, 211, and 410, without a commensurate increase in pin count for the chips 210, 211, and 410. Certainly, other embodiments and uses will be appreciated by persons skilled in the art.

Although the embodiment of FIG. 6 has been illustrated as comprising three chips 210, 211, and 410, it should be appreciated that the system 400 with the inventive chips is readily scalable to comprise any practical number of chips, based on factors such as the organization, speed, and communication protocol of the system bus 105. The scalability is achieved by inserting additional intermediate chips configured as chip 410.

Figure 7:
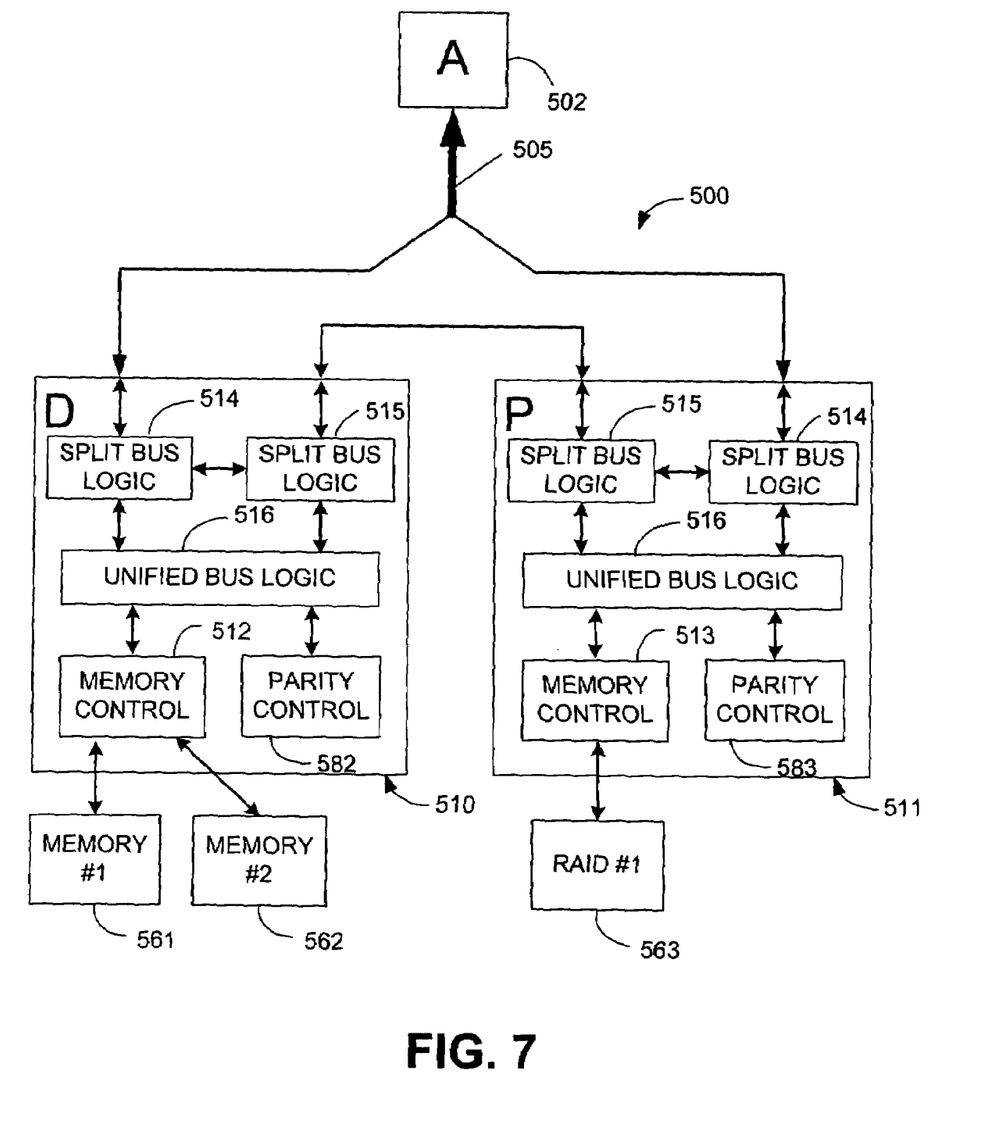
FIG. 7 is a block diagram similar to FIG. 5, illustrating an embodiment of the present invention, implementing a RAID memory system.

Reference is now made to FIG. 7, which illustrates an embodiment of the present invention, configured to implement a RAID memory controller in one configuration. In this regard, a RAID memory system 500 is implemented using integrated circuits 510 and 511 that have internal circuitry that operates substantially in accordance with the embodiment illustrated in FIG. 5. In this regard, the structure and operation of the split bus logic components 514 and 515, as well as the unified bus logic 516 have been described above, and one implementation of these logic elements has been described in detail in the co-pending application incorporated by reference above. Therefore, this description need not be repeated in order to understand the structure and operation of the integrated circuit components 510 and 511. Data memory may be implemented in the form of DIMMs 561 and 562. These data memories 561 and 562 are directly coupled to data memory control logic 512 of the first integrated circuit 510. Similarly, RAID memory 563, also referred to as parity memory, is directly coupled to memory control logic 513. Data communicated between the host 502 and data memories 561 and 562 is communicated in part through integrated circuit 510, and in part through integrated circuit 511. Parity information is also computed in one or both of the parity control logic blocks 582 and 583. Parity information may be completely exchanged between the two integrated circuits 510 and 511, so that both have full knowledge of the parity information relating to the data in data memories 561 and 562.

In a preferred embodiment of the present invention, the parity information that is stored in parity memory 563 is stored in the same address space as the data stored in memories 561 and 562. That is, the address decoding operations in memory control logic 512 and memory control logic 513 will produce the same physical memory device addresses (rank, bank, row, and column in the case of DRAM memory devices) for use with data memories 561 and 562 and parity memory 563. Lower level information and data transactions between the two integrated circuits 510 and 511 have been described in connection with the co-pending application incorporated by reference above. A higher level description of basic read and write transaction sequences is provided below.

In this regard, to carry-out a write transaction, in which the host 502 writes data into the data memory 561 and 562, the integrated circuits 510 and 511 preferably have identical address decoding configurations in the memory control logic 512 and 513. This ensures that the parity information will be stored in the same address space as the corresponding data. The host 502 sends a write request and communicates data over the system bus 505 (which is split, with a portion going to integrated circuit 510 and a separate, non-overlapping portion going to integrated circuit 511). The unified bus logic 516 of integrated circuits 510 and 511 reconstructs the write transaction and data from the split system bus 505 (as described in detail in the co-pending application referenced above). The memory control logic 512 writes data received from the write transaction into the data memory 561 and 562 at an address received with the write transaction. The parity control logic 583 calculates parity information based upon the write data and writes the parity information at the address received from the write transaction into parity memory 563.

It should be appreciated that in a preferred embodiment the write data burst lengths are identical between integrated circuits 510 and 511. The data reduction associated with the parity information is accomplished by writing to a parity memory 563 having an effective width that is one half that of the memory controller 500.

Having described a write transaction sequence, a read transaction sequence occurs as follows. As in the write transaction sequence, both integrated circuits 510 and 511 have identical address decoding configurations in the memory control logic 512 and 513. The host 502 sends a read request over the system bus 505. The unified bus logic 516 of chips 510 and 511 reconstructs the complete read transaction from the split bus, by intra-chip communications via split bus logic 515. The integrated circuit 510 issues a read command to its data memory devices 561 and 562 and integrated circuit 511 issues a read command to its data memory device 563, using the address received from the read transaction. Integrated circuit 510 receives read data from its memory devices 561 and 562, while integrated circuit 511 receives parity information from its parity memory 563. The memory control logic 513 of integrated circuit 511 forwards parity information to the parity control logic 582 via split bus logic 515. The parity control logic 582 then performs a parity check and correct operation. Integrated circuit 510 then issues a read return to the host 502 with corrected read data through the unified bus logic 516. In communicating the read data to the host, a portion of the data is communicated through split bus logic 514 of integrated circuit 510, while the remaining data is communicated via split bus logic 515 of integrated circuits 510 and 511, through the split bus logic 514 of integrated circuit 511.

It should be appreciated that the read and write transactions described above have been described from the perspective of illustrating certain unique aspects of the present invention. In this regard, general aspects of these transactions (from the perspective of the host or data memory) are known, and need not be described herein.

Figure 8:
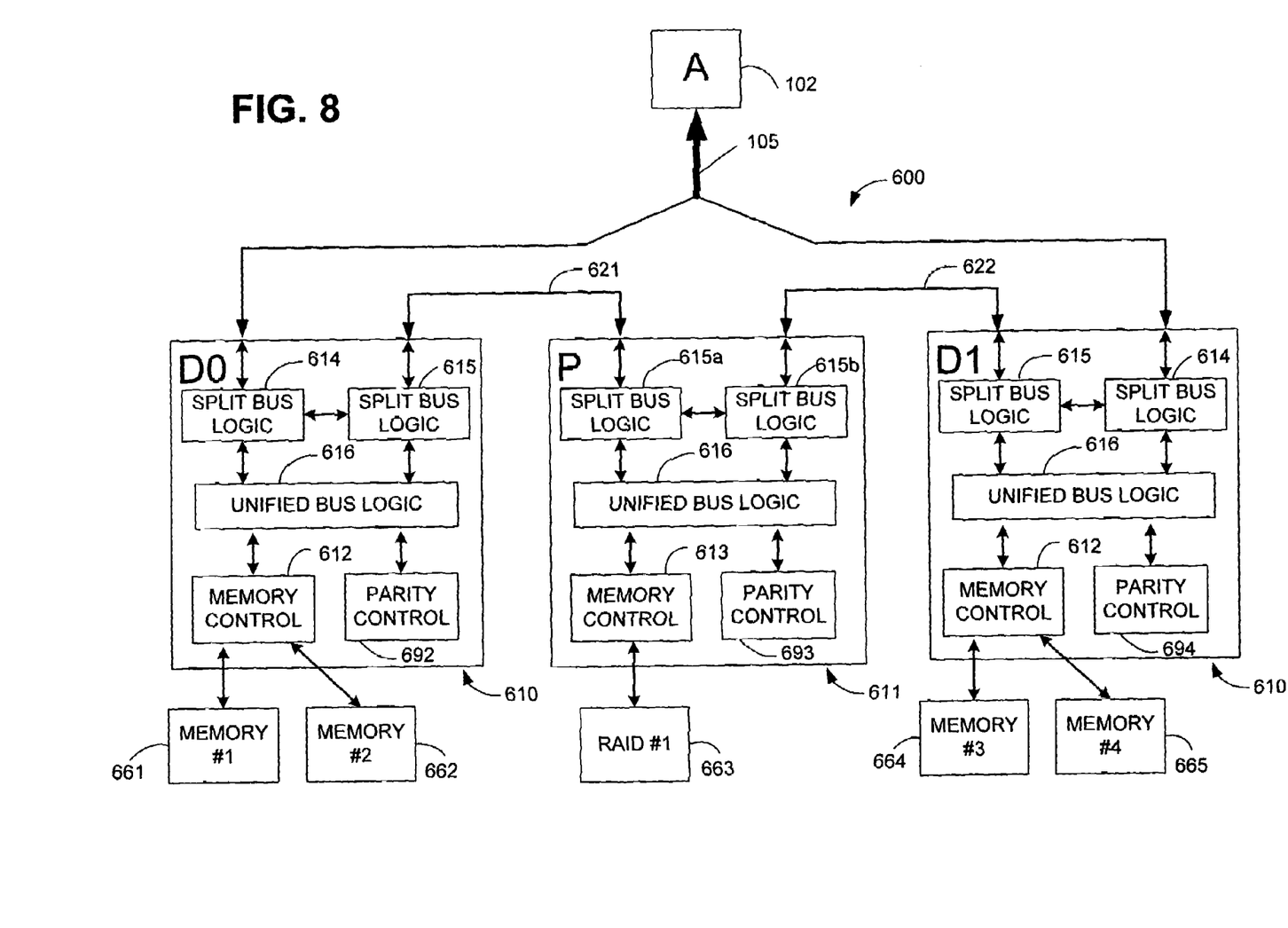
FIG. 8 is a block diagram similar to FIG. 6, illustrating an embodiment of the present invention, implementing a RAID memory system.

Reference is now made to FIG. 8, which is a block diagram illustrating an embodiment of the invention configured to implement a RAID memory system having a different configuration. As can be seen, the embodiment of FIG. 8 is similar to the configuration of FIG. 6, modified to support the memory and parity elements of a RAID system. In general, the structure and operation described in connection with the embodiments of FIGS. 6 and 7 are sufficient to understand the structure and operation of the embodiment illustrated in FIG. 8. In short, two integrated circuits 610 and 612 are similarly configured and operate similar to the integrated circuit 510 of FIG. 7. Likewise, the integrated circuit 611 is configured and operate similar to the integrated circuit 511 of FIG. 7. As shown in FIG. 8 however, in this RAID configuration, additional data memories 664 and 665 are provided. Further, communications that are split across the system bus 105 are communicated into integrated circuit 610 via the intra-chip links 621 and 622 and the various split bus logic components into the respective unified bus logic components. A write transaction sequence from the host 102 to memory 661, 662, 664, and 665 occurs the same in the RAID system of FIG. 8 as was described for the RAID system of FIG. 7. A read transaction sequence, however, differs slightly. In this regard, the embodiment of FIG. 7 described how the integrated circuit 511 forwards parity data to the parity control logic 582 of integrated circuit 510 over the intra-chip communication link.

In contrast, in a read transaction sequence of the embodiment of FIG. 8, read data is forwarded from the memory control logic 612 and 614 to the memory control logic 613 over intra-chip communication links 621 and 622, respectively. The parity control logic 693 of integrated circuit 611 then performs the parity check and correct operation. Integrated circuit 611 then issues a read return to the host 102 with corrected read data through the unified bus logic 616. As previously described, this data is split and communicated via the split bus logic 615A and 615B across intra-chip communication links 621 and 622, through split bus logic bus components 615 and 614, across the system bus 105 to host 102.

Further still, in the embodiment of FIG. 7, parity information was computed from two DIMMs worth of data. In similar fashion, in the embodiment of FIG. 8, parity information is computed from four DIMMs worth of data. Consequently, the parity memory 663 is effectively one-fourth of the width of the data memory. However, as in FIG. 7, the burst length of parity information is the same as data, and address decoding is the same for the parity controller as for both the data memory controllers.

The foregoing has illustrated the invention in the context of RAID memory systems. However, it should be appreciated that the invention may have applicability in non-RAID memory systems as well. Again, since there are a wide variety of particular functional and system variations, implementation-specific details need not be provided herein as such details will often be driven by design objectives and tradeoffs, and are within the level of skill possessed by one of ordinary skill in the art.

What is claimed is:

1. A memory system comprising:
   first and second data memory components for storing data;
   one parity memory component for storing parity information;
   a first integrated circuit component directly coupled to the first and second data memory components; and
   a second integrated circuit component directly coupled to the parity memory component and indirectly coupled to the first and second data memory components through the first integrated circuit, the first integrated circuit being indirectly coupled to the parity memory through the second integrated circuit;
   wherein the first integrated circuit is configured to inter-communicate data with a host over a first portion of a system bus, the portion extending between the first integrated circuit and the host, the first and second integrated circuits further including reciprocally-configured logic to inter-communicate such that data communicated between the first integrated circuit and the host is capable of being communicated from the first integrated circuit to the second integrated circuit over a separate bus.

2. The memory system of claim 1, wherein the memory system is a RAID memory system.

3. The memory system of claim 1, wherein the second integrated circuit is configured to intercommunicate data with the host over a second portion of the system bus, wherein the second portion is non-overlapping with the first portion, wherein the second portion extends between the second integrated circuit and the host, the first and second integrated circuits being further configured such that data communicated between the second integrated circuit and the host is communicated from the second integrated circuit to the first integrated circuit over the separate bus.

4. The memory system of claim 1, wherein the first portion of the system bus is substantially one-half of the system bus and the second portion of the system bus is a remainder of the system bus.

5. The memory system of claim 1, wherein the system bus is a point-to-point serial communication bus.

6. The memory system of claim 1, further comprising third and fourth data memory components for storing data, and a third integrated circuit component directly coupled to the third and fourth data memory components.

7. The memory system of claim 6, wherein the second integrated circuit component is indirectly coupled to the third and fourth data memory components through the third integrated circuit, and the third integrated circuit is indirectly coupled to the parity memory through the second integrated circuit.

8. The memory system of claim 7, wherein the third integrated circuit is configured to intercommunicate data with the host over a second portion of the system bus, wherein the second portion is non-overlapping with the first portion, wherein the second portion extends between the third integrated circuit and the host, the first, second, and third integrated circuits being further configured such that data communicated between the first integrated circuit and the host is capable of being communicated to the third integrated circuit through the second integrated circuit, such that data communicated between the third integrated circuit and the host is capable of being communicated to the first integrated circuit through the second integrated circuit.

9. A memory system comprising:
  a host integrated circuit component;
  at least two data memories;
  at least one parity memory for storing parity information corresponding to data stored in a corresponding address space of the data memories;
  at least two controller integrated circuits, each controller integrated circuit (IC) comprising memory control logic configurable to control communications between the controller IC and data memories directly connected to the controller IC, parity logic configurable to compute parity information for data communicated to or from the data memories, logic configurable to communicate the parity information to or from a companion IC, and logic configurable to communicated data to or from a companion IC.

10. The memory system of claim 9, wherein the memory system is a RAID memory system.

11. The memory system of claim 9, wherein each of the at least two controller integrated circuits further comprises a bus interface for direct coupling to only a portion of a system bus that is coupled to the host for communication therewith.

12. The memory system of claim 11, wherein precisely two controller integrated circuits are configured to implement a RAID 3 memory system, wherein each of the two integrated circuits is configured for direct communication with the host integrated circuit over only a portion of the system bus, wherein a first controller integrated circuit is configured for direct communication with the host integrated circuit over a first portion of the system bus and a second controller integrated circuit is configured for direct communication with the host integrated circuit over a second portion of the system bus.

13. The memory system of claim 9, further including a third controller integrated circuit.

14. The memory system of claim 13, wherein a first and third controller integrated circuit are each configured for direct communication with the host integrated circuit over only a portion of the system bus, wherein a first controller integrated circuit is configured for direct communication with the host integrated circuit over a first portion of the system bus and the third controller integrated circuit is configured for direct communication with the host integrated circuit over a second portion of the system bus.

15. The memory system of claim 14, wherein a second controller integrated circuit includes interfaces for communicating directly with the first and third controller integrated circuits, wherein the second controller integrated circuit is not directly connected to the system but is capable of communicating with the host integrated circuit indirectly through the first and third controller integrated circuits.

16. An integrated circuit component for performing memory control comprising:
  host communication logic capable of communicating with a host integrated circuit over only a portion of a system bus;
  data memory control logic configurable to control communications with directly connected data memory; and
  parity control logic configurable to compute parity information for data stored in associated data memory;
  intra-chip communication logic configurable to communicate data and/or parity information with a companion integrated circuit component over a dedicated communication link with the companion integrated circuit;
  wherein the data memory control logic, the parity control logic, and the intra-chip communication logic are capable of being configured in one configuration selected from the group consisting of:
    a) the data memory control logic is configured to communicate with directly-connected data memory and the parity control logic is configured to communicate parity information indirectly with a parity memory directly connected with a companion integrated circuit via the intra-chip communication logic; and
    b) the parity control logic is configured to compute parity information and communicate parity information with a directly-connected parity memory and the data control logic is configured to communicate indirectly with data memory directly connected with a companion integrated circuit via the intra-chip communication logic.

* * * * *